ANTENNA NETWORK EMPLOYING A VARIABLE CAPACITANCE

Filed July 16, 1954 2 Sheets-Sheet 1

INVENTOR.
RALPH R. WILLIAMS,
BY
McMorrow, Berman & Davidson
ATTORNEYS.

Feb. 16, 1960 R. R. WILLIAMS 2,925,598

ANTENNA NETWORK EMPLOYING A VARIABLE CAPACITANCE

Filed July 16, 1954 2 Sheets-Sheet 2

INVENTOR.
RALPH R. WILLIAMS,
BY
McMorrow, Berman + Davidson
ATTORNEYS.

United States Patent Office 2,925,598

Patented Feb. 16, 1960

2,925,598

ANTENNA NETWORK EMPLOYING A VARIABLE CAPACITANCE

Ralph R. Williams, Detroit, Mich.

Application July 16, 1954, Serial No. 443,780

5 Claims. (Cl. 343—861)

This invention relates to antenna networks, and more particularly to antenna networks which may be employed for television and F.M. reception.

The main object of the invention is to provide a novel and improved antenna network particularly suitable for connection to the terminals of a household alternating current source, whereby the household alternating current wiring system may be employed as a signal collector, the improved network including means for substantially matching the signal collector to the input circuit of a receiver and for tuning the network to provide maximum gain for a desired channel frequency.

A further object of the invention is to provide an improved antenna network suitable for use with any existing means which can function as a signal collector, such as electrical power wires, telephone wires, metallic frame structures, and the like, said improved network being provided with novel and efficient means for coupling the signal collector to the input circuit of a receiver and for suitably tuning the resultant circuit to provide maximum signal gain for a desired frequency.

A further object of the invention is to provide an improved antenna network which is simple in construction, which is easy to operate, and which is especially suitable for use with household alternating current wiring so that said wiring may be employed as a signal collector in conjunction with a television or other receiver.

A still further object of the invention is to provide an improved antenna network which involves inexpensive components, which is of durable construction, and which is relatively compact in size.

Further objects and advantages of the invention will become apparent from the following description and claims, and from the accompanying drawings, wherein:

Figures 1, 2, 3, 8, 9, 10:
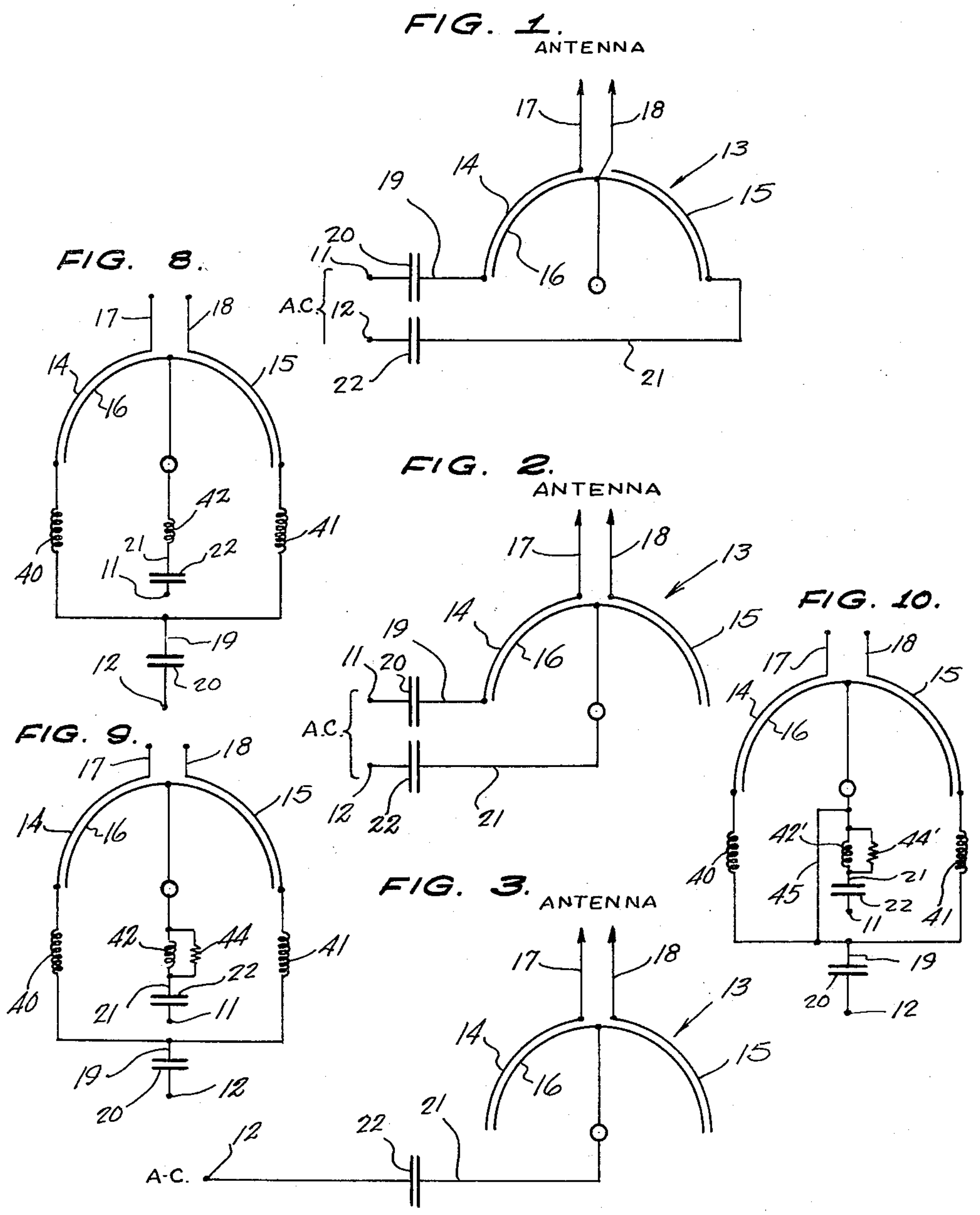
Figure 1 is a schematic wiring diagram illustrating one form of antenna network constructed in accordance with the present invention.
Figure 2 is a schematic wiring diagram illustrating another form of antenna network according to the present invention.
Figure 3 is a schematic wiring diagram illustrating a still further form of antenna network according to the present invention, illustrating the use of only one of the line conductors of a household alternating current system employed as a signal collector.
Figure 8 is a schematic wiring diagram of a still further modified antenna network according to this invention.
Figure 9 is a schematic wiring diagram of another modification of the antenna network of the present invention.
Figure 10 is a schematic wiring diagram of a further modification of the improved antenna network of the present invention.

Referring to the drawings, and more particularly to Figure 1, 11 and 12 designate the input terminals of the network, said input terminals 11 and 12 being adapted to be connected to the terminals of a household alternating current source. Designated generally at 13 is a variable condenser comprising the spaced stators 14 and 15 and the common rotor 16 which is capacitively coupled with the stators 14 and 15, the rotor being mounted for rotation on an axis normal to and equidistant from the respective stators, as will be presently described, said rotor having parallel spaced plates arranged to intermesh with the plates of the stators.

Electrically connected to stator 14 is a terminal conductor 17, and electrically connected to the rotor 16 is another terminal conductor 18, said conductors 17 and 18 forming a two-wire transmission line, which may, for example, be a conventional 300 ohm transmission line, said conductors being adapted to be connected to the input circuit of a receiver, for example, a television receiver.

The stator 14 is connected to the terminal 11 by a wire 19 which has connected in series therewith a condenser 20 which has a capacity of the order of .002 microfarad. Connected between the stator 15 and the remaining input terminal 12 of the network is a conductor 21 which has connected in series therewith another fixed condenser 22, also having a capacity of the order of .002 microfarad.

The condensers 20 and 22 are employed in the network to reduce the effective capacity defined by the household alternating current line wires, and to thereby enable the network to be properly tuned to resonance with signals of relatively high frequency, such as television signals. Said tuning is effected by the adjustment of the rotor 16 of the three-terminal variable condenser 13, the rotor 16 being movable to vary its capacity with respect to the stators 14 and 15. As will be presently explained, the adjustment of the rotor 16 increases the capacity between said rotor and one of the stators and reduces the capacity between the rotor and the other of the stators. Thus, in Figure 1, the capacity across the transmission line wires 17 and 18 may be increased or reduced, and simultaneously, the capacity between the line wire 18 and the conductor 21 will be reduced or increased, depending upon the direction of rotation of the rotor 16.

Since the network inherently contains a certain amount of inductance, the adjustment of the rotor 16 enables the circuit to be tuned substantially to resonance with a desired high frequency signal. At the same time, the network enables the input circuit of the television receiver to be matched to the resultant impedance of the household alternating current wiring appearing across the terminals 11 and 12, whereby "ghosts" and other undesirable mismatch effects may be eliminated.

Figures 4, 5, 6, 7:
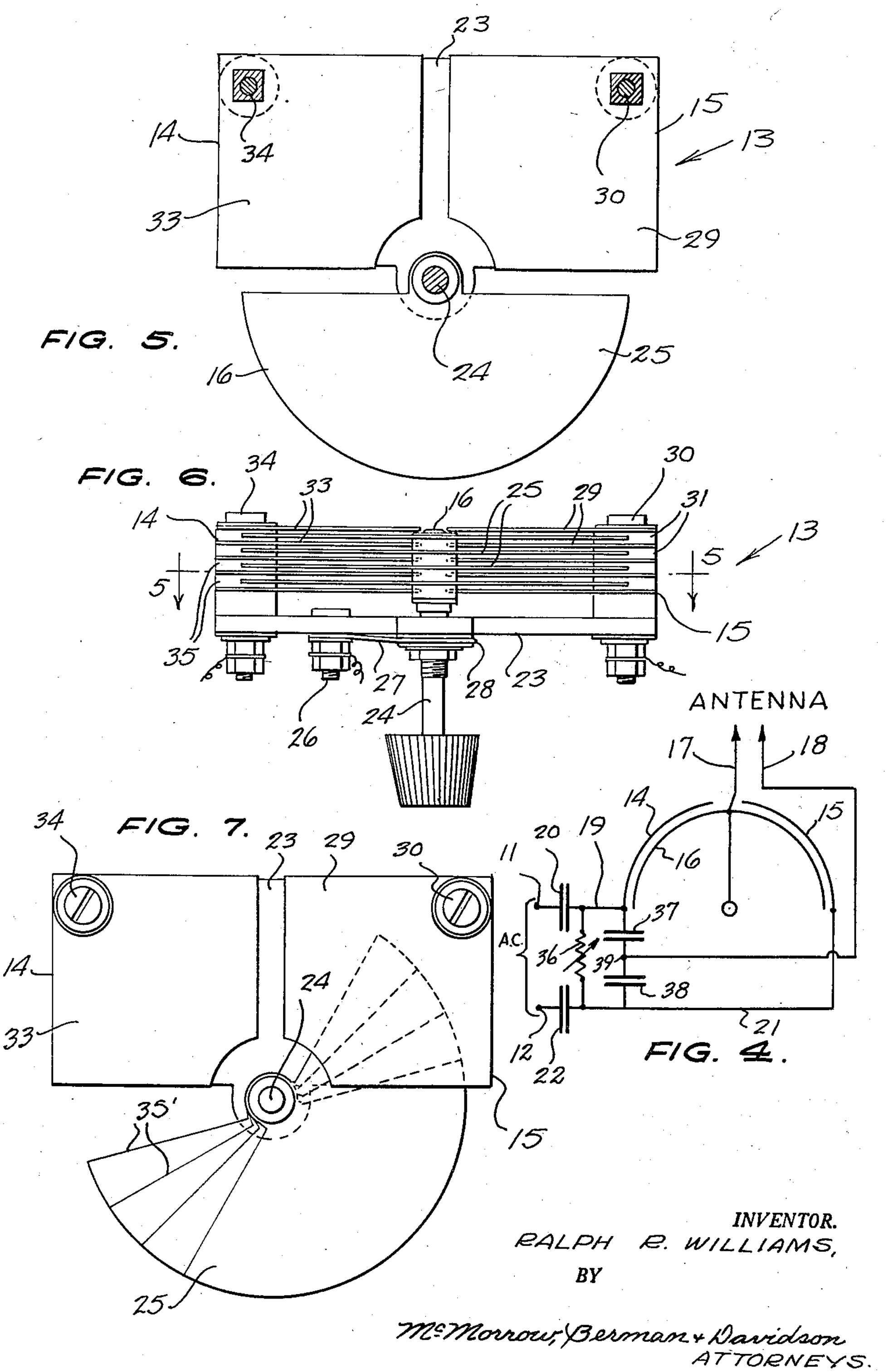
Figure 4 is a schematic wiring diagram of a still further modification of antenna network according to the present invention.
Figure 5 is a cross sectional view taken through a three-terminal variable condenser employed in the improved antenna networks illustrated in Figures 1 to 4, said view being taken on the line 5—5 of Figure 6.
Figure 6 is a top view of the variable condenser shown in Figure 5.
Figure 7 is an end elevational view of a modified form of three-terminal variable condenser which may be used in the antenna networks according to the present invention.

Referring now to Figures 5 and 6, the variable condenser 13 comprises the frame 23 on which is rotatably mounted the rotor 16, said rotor comprising a shaft 24 to which is secured a plurality of spaced parallel, substantially semicircular rotor plates 25, the shaft 24 and plates 25 being of suitable conductive material, and the frame 23 being preferably of insulating material. The terminal 26, mounted on frame 23 is electrically connected to rotor 16, as by the connecting strap 27 secured to the terminal 26 and having a ring-like end portion 28 surrounding the rotor 24 and making frictional contact therewith in a manner well known in the art. The stator 15 comprises a plurality of spaced parallel substantially rectangular plates 29 which are secured on one side of the rotor shaft 24, as by bolts 30 extending through the stator plate 29 and through intervening insulating washers 31, the stator plate 29 being thus securely supported parallel to and spaced from the planes of the rotor plates 25 and being meshingly cooperable therewith. Similarly, the stator 14 comprises the spaced parallel, substantially rectangular plates 33 supported on the opposite side of the rotor shaft 24 by a bolt member 34 which extends through the plates 33 and through intervening insulating spacing washers 35, as is clearly shown in Figure 5.

As will be apparent from Figures 5 and 6, the rotor plates are mounted for rotation on an axis normal to and equidistant from the respective stators 14 and 15, the rotor plates being identical in shape. However, as shown in Figure 7, the rotor plates may have their edges 35′ successively angularly spaced around the rotor axis, whereby a finer adjustment of capacity may be obtained at the end portions of the rotor with respect to a given stator than is obtainable when a substantial portion of the rotor is enmeshed with said stator.

In other words, with the arrangement shown in Figure 7, the capacity characteristic of the condenser exhibits a slowly rising initial portion as the edges of the rotor intermesh with a given stator, then a more steeply rising portion (capacity vs. degrees of angular rotation of the rotor) when all the rotor plates intermesh with the plates of the stator, and then, a reversal of the characteristic as the rotor unmeshes from said stator.

In the form of the invention shown in Figure 2, the transmission line wire 18 is connected to the stator 15 and the input conductor 21, containing the fixed condenser 22 is connected to the rotor 16. With the arrangement of Figure 2, rotation of the rotor 16 varies the shunt capacity existing across the input conductors 19 and 21, by the variation of the capacity between the rotor 16 and the stator 14. At the same time, the series capacity between the input conductor 21 and the transmission line wire 18 is varied by the change of capacity between rotor 16 and stator 15. Thus, the network is tunable to resonance with a desired high frequency signal, and a suitable impedance match may be obtained between the receiver input circuit and the signal collector, as in the form of the invention shown in Figure 1.

In the form of the invention illustrated in Figure 3, only one line wire of the household alternating current system is employed as the signal collector, said line wire being connected to the input terminal 12. The input terminal 12 is connected by the conductor 21, including the fixed condenser 22 to the rotor 16 of the three-terminal variable condenser 13. Stator 14 is connected to the antenna transmission line wire 17, and the stator 15 is connected to the antenna transmission line wire 18, as illustrated. When the rotor 16 is adjusted, the capacity between the transmission line wire 17 and the input conductor 21 is changed, and the capacity between the input conductor 21 and the transmission line wire 18 is simultaneously changed in an inverse manner, whereby the resultant network may be tuned to provide a resonance condition with a desired signal frequency.

In the form of the invention illustrated in Figure 4, the transmission line wire 17 is connected to the rotor 16. Stator 14 is connected to the network input terminal 11 by the conductor 19 which has the fixed condenser 20 in series therewith. Stator 15 is connected to the input terminal 12 by the conductor 21 which has the fixed condenser 22 in series therewith. Connected across the stators 14 and 15 is a variable resistor 36 which has a maximum resistance of the order of 30 ohms, namely, of the same order as the impedance of the alternating current wiring system at television frequencies, which has been found to be of the order of 30 ohms. Designated at 37 and 38 are a pair of additional fixed condensers connected in series across the stators 14 and 15, the condensers 37 and 38 being of the same order of capacity as the condensers 20 and 22, namely, having capacities of approximately .002 microfarad. The common terminal 39 of the series connected fixed condensers 37 and 38 is connected to the transmission line conductor 18, as shown.

As in the previously illustrated forms of the invention, the circuit may be tuned to resonance with a desired signal frequency by adjusting the rotor 16. Matching of the antenna input circuit to the household alternating current line conductors is facilitated and improved by the provision of the variable resistor 36 which may be adjusted, after a signal has been tuned to maximum, to eliminate "ghosts" and other undesirable mismatch conditions.

In the form of the invention shown in Figure 8, the stators 14 and 15 are connected to the respective output terminal wires 17 and 18, as in Figure 2. Said stators are connected through respective inductances 40 and 41 to the input conductor 19, which is connected to the input terminal 12 through the condenser 20. The rotor 16 is connected through an inductance 42 to the input conductor 21, which is connected to the input terminal 11 through the condenser 22. Coils 40 and 41 each comprises approximately 18 turns of No. 20 gauge double enamel covered wire on a 3/16 inch diameter form. Coil 42 comprises approximately 9 turns of similar wire on a form of similar diameter.

The network shown in Figure 9 is similar to that of Figure 8 but employs a 30 ohm resistor 44 connected across the inductance 42.

The network shown in Figure 10 is similar to Figure 9, but employs a different rotor circuit inductance 42′ and a different resistor 44′ connected across the inductance. Inductance 42′ comprises approximately 18 turns of No. 22 gauge double enamel wire on a 3/16 inch diameter coil form. Resistor 44′ has a value of 300 ohms. Also, a wire 45 connects the rotor 16 to the common junction of the coils 40 and 41 and hence to the input wire 19. The use of wire 45 is optional.

As will be understood by those skilled in the art, various other sizes of coils and other values of resistors may be employed.

In the networks above described, compensation is made for the relatively large capacity existing between the line wires of household alternating current supply systems by the provision of a variable capacity in series with the line wire capacity, making the resultant circuit capacity relatively small. In the arrangement of Figures 1, 2 and 3, as the rotor 16 meshes with the stator 14, too much capacity may be placed across the transmission line conductors 17 and 18, making it impossible to tune the network. However, this undesirable effect may be avoided by employing the arrangement shown in Figure 7, wherein the rotor plates have their leading edges angularly spaced around the rotor axis so that the shunt capacity across transmission line wires 17 and 18 may be made very small, while at the same time being variable to provide the necessary tuning of the network.

While certain specific embodiments of an improved antenna network have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An antenna coupling network comprising a single unitary variable condenser having a pair of stators electrically insulated from each other and a common rotor capacitively coupled with both of said stators, said stators each having parallel spaced plates and said rotor being mounted for rotation on an axis normal to and equidistant from the respective stators, said rotor having parallel spaced plates arranged to adjustably intermesh with the plates of said stators, respective terminals connected to said stators and rotors, first and second circuit means connected to the stator terminals, said first and second circuit means being adapted to be connected to the respective terminals of a household alternating current source, a shunt resistor connected between said first and second circuit means, a pair of fixed condensers connected in series across said stators, and respective conductors connected to the rotor terminal and the common connection of said fixed condensers and being arranged for connection to the input terminals of a receiver, whereby to provide balanced coupling between the alternating current source and the input terminals of the receiver.

2. An antenna coupling network comprising a single unitary variable condenser having a pair of stators electrically insulated from each other and a common rotor capacitively coupled with both of said stators, said stators each having parallel spaced plates and said rotor being mounted for rotation on an axis normal to and equidistant from the respective stators, said rotor having parallel spaced plates arranged to adjustably intermesh with the plates of said stators, respective terminals connected to said stators and rotor, first and second circuit means connected to the stator terminals, said first and second circuit means being adapted to be connected to the respective terminals of a household alternating current source, a shunt impedance connected between said first and second circuit means, a pair of additional impedances connected in series across said stators, and respective conductors connected to the rotor terminal and the common connection of said last-named impedances and being arranged for connection to the input terminals of a receiver, whereby to provide balanced coupling between the alternating current source and the input terminals of the receiver.

3. An antenna coupling network comprising a single unitary variable condenser having a pair of stators electrically insulated from each other and a common rotor capacitively coupled with both of said stators, said stators each having parallel spaced plates and said rotor being mounted for rotation on an axis normal to and equidistant from the respective stators, said rotor having parallel spaced plates arranged to adjustably intermesh with the plates of said stators, respective terminals conected to said stators and rotor, first and second circuit means connected to the stator terminals, said first and second circuit means being adapted to be connected to the respective terminals of a household alternating current source, a variable resistor connected between said first and second circuit means, a pair of impedances connected in series across said stator terminals, and respective conductors connected to the rotor terminal and the common connection of said impedances and being arranged for connection to the input terminals of a receiver, whereby to provide balanced coupling between the alternating current source and the input terminals of the receiver.

4. An antenna coupling network comprising a single unitary variable condenser having a pair of stators electrically insulated from each other and a common rotor capacitively coupled with both of said stators, said stators each having parallel spaced plates and said rotor being mounted for rotation on an axis normal to and equidistant from the respective stators, said rotor having parallel spaced plates arranged to adjustably intermesh with the plates of said stators, respective terminals connected to said stators, an additional terminal connected to said rotor, a variable shunt impedance connected between the stator terminals, a pair of additional impedances connected in series across said stator terminals, and respective conductors connected to said additional terminal and the common connection of said two last-named impedances and being arranged for connection to the input terminals of a receiver.

5. An antenna coupling network comprising a single unitary variable condenser having a pair of stators electrically insulated from each other and a common rotor capacitively coupled with both of said stators, said stators each having parallel spaced plates and said rotor being mounted for rotation on an axis normal to and equidistant from the respective stators, said rotor having parallel spaced plates arranged to adjustably intermesh with the plates of said stators, respective terminals connected to said stators and rotor, a pair of fixed condensers, respective circuit means including said fixed condensers and connected to the stators, each circuit means including one of said fixed condensers, said circuit means being adapted to be connected to the respective terminals of a household alternating current source, a shunt resistor connected between said two circuit means, a pair of additional fixed condensers connected in series across said stators, and respective conductors connected to the rotor and the common connection of said last-named fixed condensers and being arranged for connection to the input terminals of a receiver, whereby to provide balanced coupling between the alternating current source and the input terminals of the receiver.

References Cited in the file of this patent

UNITED STATES PATENTS

| | | |
|---|---|---|
| 1,591,177 | Minge | July 6, 1926 |
| 1,604,508 | Zisch | Oct. 26, 1926 |
| 1,992,433 | Klotz | Feb. 26, 1935 |
| 2,051,503 | Usselman | Aug. 18, 1936 |
| 2,410,657 | Hershberger | Nov. 5, 1946 |
| 2,553,734 | Adler | May 22, 1951 |
| 2,581,983 | Thompson | Jan. 8, 1952 |
| 2,666,846 | Davis | Jan. 19, 1954 |